United States Patent [19]
Stolarik

[11] 3,835,273
[45] Sept. 10, 1974

[54] PENDULUM-TYPE INERTIA SENSOR SWITCH

[75] Inventor: Eugene Stolarik, Minneapolis, Minn.

[73] Assignee: Control Techniques Corporation, Minneapolis, Minn.

[22] Filed: Feb. 2, 1973

[21] Appl. No.: 329,062

[52] U.S. Cl............................ 200/61.48, 200/61.51
[51] Int. Cl. ............................................ H01h 35/14
[58] Field of Search....... 200/61.45 R, 61.48, 61.49, 200/61.5, 61.51, 61.52, 166 BH; 102/70.2 R

[56] References Cited
UNITED STATES PATENTS

| | | | |
|---|---|---|---|
| 2,075,040 | 3/1937 | Kieber | 200/61.51 X |
| 2,076,251 | 4/1937 | Rockola | 200/61.51 |
| 2,938,973 | 5/1960 | Swanwick | 200/61.48 |
| 2,980,773 | 4/1961 | Leaman et al. | 200/61.51 |
| 3,180,952 | 4/1965 | Preisz | 200/61.48 |
| 3,597,753 | 8/1971 | Tabankin | 200/61.49 X |
| 3,621,417 | 11/1971 | Halaby | 200/61.48 X |
| 3,631,804 | 1/1972 | Anderson et al. | 102/70.2 R X |
| 3,647,999 | 3/1972 | Mazelsky | 200/61.45 R |

*Primary Examiner*—James R. Scott

[57] ABSTRACT

A multi-directional crash sensor for triggering air bag safety devices on a vehicle, having different response thresholds to accelerations from different directions. A pendulum having one electrical contact is pivoted within a housing for motion in any direction in response to acceleration. A second contact is positioned around the pendulum and is configured so that the angular displacement from the pendulum's nominal position to the second contact is different for different directions of motion of the pendulum. A non-conductive membrane having a predetermined puncture resistance may be placed over the contact and the pendulum may be provided with sharp protrusions for piercing the membrane to make electrical contact only when accelerations of predetermined magnitude occur.

9 Claims, 6 Drawing Figures

PATENTED SEP 10 1974 3,835,273

PENDULUM-TYPE INERTIA SENSOR SWITCH

BACKGROUND OF THE INVENTION

The present invention pertains to the field of crash sensors for vehicles, suitable for triggering air bag safety devices.

In recent years there has been great interest in automobile safety, and much of this interest has centered upon so-called air bag safety devices. In the use of such devices, when a collision occurs, a detonator is triggered, causing the air bag to inflate very rapidly to restrain the passenger and prevent injuries. The device used to trigger the air bag detonator is generally referred to as a crash sensor. To be acceptable for general use in automobiles, a crash sensor must be able to distinguish between a crash of sufficient magnitude warranting deployment of the air bag on the one hand, and normal accelerations imparted to the car by vibrations, rough roads, and even potholes, on the other hand. The ability to discriminate among the various accelerations applied to a car is critical, because of the dangerous consequences which can result from either an unwanted triggering of the air bar of the bag to trigger when it is needed. Also, a sensor for general use must be very rugged and reliable, so that it may survive for years mounted on a car and subject to extreme environmental conditions without requiring maintenance or adjustment, and still be able to perform as designed should a collision occur.

Ideally, in addition to being able to discriminate between crash and non-crash accelerations, a sensor should be able to respond differentially to accelerations from different quarters of the automobile. Because different models of automobiles have different structural rigidity and energy absorbing characteristics when hit from different angles, it may be desirable to require the air bag to trigger for different levels of acceleration in front end, rear end, or side collisions. This in turn requires a crash sensor which is able to respond with different sensitivities to accelerations in the various directions.

In the prior art, various types of spring loaded mass accelerometers have been used as crash sensors. Many of such devices have suffered from inability to distinguish between crash and normal accelerations. Also, many of these prior art devices are unable to respond to the lateral acceleration, of side collision, since many spring loaded mass accelerometers are sensitive along only one axis. Further, the prior art devices fail to deploy the air bag in the case of roll over of an out-of-control car, where no actual collision has occurred.

SUMMARY OF THE INVENTION

The present invention overcomes the shortcomings of the prior art devices by providing a crash sensor for triggering an air bag safety device on a vehicle which is capable of discriminating between crash and normal accelerations, and further, is capable of responding with different sensitivity thresholds to crash accelerations in different directions. According to the present invention, there is provided a crash sensor having a hermetically sealed housing adapted for attachment to an appropriate place on the frame or body of the vehicle. An inertial pendulum is pivotally suspended within the housing so as to be free to move in any direction from its nominal at rest position. One electrical contact device is mounted on the pendulum, and a second electrical contact is mounted within the housing for contact by the pendulum when a collision of sufficient magnitude occurs. The angular displacement of the second contact from the nominal position of the pendulum, together with the length and mass of the pendulum, and the damping of the pendulum due to friction or viscosity are predetermined so as to fix the sensitivity of the crash sensor. A non-conducting coating having a predetermined resistance to penetration may be placed over the second contact. Sharp protrusions on the pendulum pierce the non-conductive coating thereby completing the electrical circuit, only when accelerations of predetermined magnitude are experienced.

The use of a pendulum results in the additional advantage of triggering the air bag during roll over of an automobile, even though it had not experienced a collision (i.e. acceleration) otherwise sufficient to trigger the sensor.

DESCRIPTION OF THE PREFERRED EMBODIMENT

Figure 1:
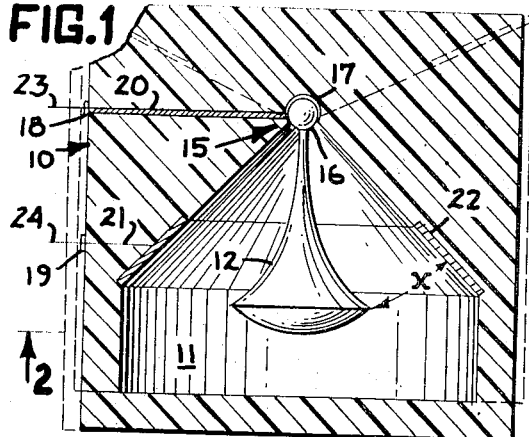
FIG. 1 is a vertical section diagrammatically showing a crash sensor according to the present invention.

The crash sensor of FIG. 1 has a housing 10 which may be made of any suitable material. Preferably, housing 10 is hermetically sealed, so that dust, moisture, etc. cannot contaminate or degrade the performance of the sensor. Housing 10 defines an inner chamber 11. The exact shape and size of chamber 11 may vary, depending in part upon manufacturing convenience, so long as it is large enough to accommodate the pendulum and contacts in proper relationship as described herein. In the embodiment shown in FIG. 1, chamber 11 has a large lower portion, and a tapering upper portion. An inertial pendulum member 12 is suspended within chamber 11. In the preferred embodiment, pendulum 12 is integrally formed as a single unit. Alternatively, pendulum 12 could be made of a stem member and a bob portion attached by any convenient means. It will be appreciated that the shape and mass distribution of the pendulum affect the radius of gyration, which in turn affects the sensitivity of the device, as explained in a subsequent paragraph. Pendulum 12 is suspended from housing 10 within chamber 11 by pivotal suspension means 15. In FIG. 1, pendulum 12 is shown at its nominal, at rest position, when the crash sensor is mounted on a vehicle, with the correct side up. The function of pivotal suspension means 15, is to allow pendulum 12 to swing freely, under the force of accelerations, in any direction from its nominal position. In other words, pendulum 12 is freely suspended for swinging left and right in the plane of FIG. 1, into and out of the plane of FIG. 1, and any combination of these two motions. In the embodiment shown in FIG.

1, pivotal suspension 15 comprises a ball and socket joint. A ball 16 is attached to the stem of the pendulum and fits within a socket 17 formed in the top portion of housing 10.

A pair of electrical terminals, 18 and 19, are provided on the outside of housing 10. Terminal 18 connects internally to a lead 20, which passes through housing 10 to make electrical contact with pendulum 12. If pendulum 12 is made of a conductive metal, then lead 20 may contact it at any point, such as on ball 16 as shown in FIG. 1. If for some reason it is desired to make pendulum out of a non-conductive material, then lead 20 can pass down or through the stem of the pendulum to the edge portion of the pendulum, since it is this portion of the pendulum which is used as a switch. Another lead 21 connects internally to terminal 19, and passes through housing 10 to a contact plate 22. When a collision occurs, acceleration forces cause pendulum 12 to swing through the distance $X$ so that the periphery of the pendulum makes electrical contact with contact plate 22, thereby completing the circuit between terminals 18 and 19. A pair of leads 23 and 24 connect to a battery and detonator circuit for the air bag device.

Figure 2:
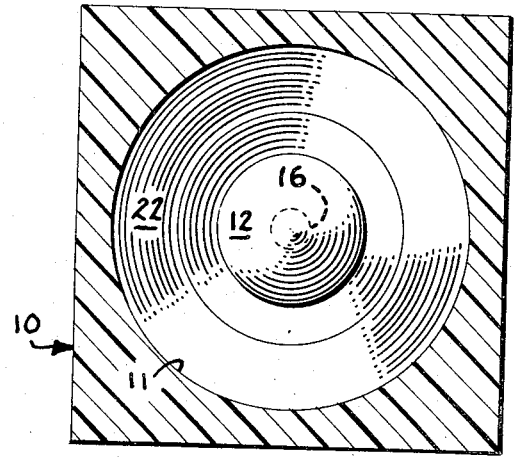
FIG. 2 is a view generally along the lines 2—2 in FIG. 1.

As seen in FIGS. 1 and 2, contact plate 22 is generally circular in shape and is mounted to the inside wall of housing 10 within chamber 11, thereby surrounding pendulum 12. Actually, due to the tapering of the upper walls of the chamber, contact plate 22 has the shape of the surface of a frustum of a cone. The exact configuration of contact plate 22 is not critical; the critical factor is the angle through which pendulum 12 must travel before the edge of the pendulum contacts contact plate 22.

The magnitude and duration of acceleration acting upon housing 10 which is necessary to force pendulum 12 into contact with contact plate 22, is a function of the effective length and mass of the pendulum, its radius of gyration, and the angular distance through which pendulum must travel.

For example, the dotted lines in FIG. 1 indicate an alternative embodiment in which the contact plate is spaced further from the nominal position of the pendulum, thereby giving the alternate device a higher threshold value. This latter factor, in turn depends upon the relative positioning of contact plate 22 with respect to the nominal position of pendulum 12. For a given application of the crash sensor in a particular car model, test data concerning the collision energy absorbing characteristics of the automobile structure and the acceleration forces experienced at particular locations on the structure. From this data, the length and mass of the pendulum, and the positioning of the contact plate are determined in order to provide the proper threshold sensing between the "normal" and "collision" accelerations. Additionally, it may be desirable in some cases to introduce a calculated amount of friction in the pivotal suspension 15, to provide damping of the system, and also to provide another control over the switching threshold. Alternatively, damping can be provided by filling the chamber of the housing with a non-conductive fluid media having a predetermined viscosity.

Figure 4:
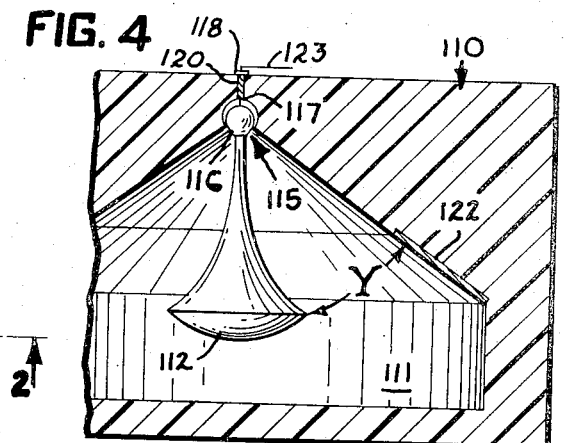
FIG. 4 is a vertical section taken along line 4—4 of FIG.3.
Figure 5:
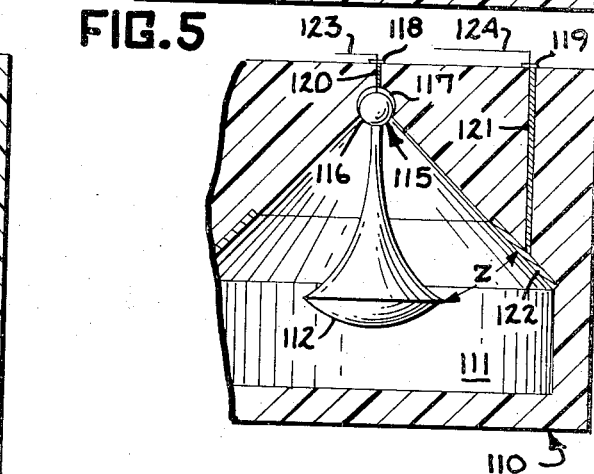
FIG. 5 is a view taken along line 5—5 of FIG. 3.
Figure 3:
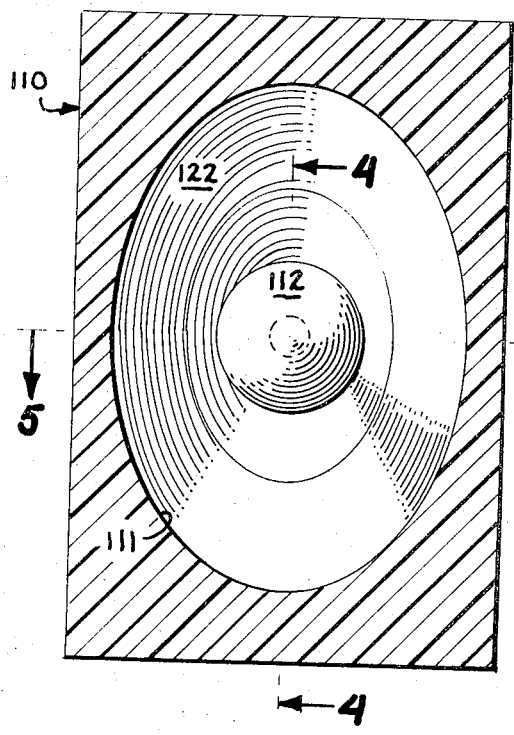
FIG. 3 is a horizontal section diagrammatically showing another embodiment of the present invention.

In addition to the features and performance of the embodiment shown in FIGS. 1 and 2, the embodiment of the present invention shown in FIGS. 3, 4 and 5 offer the added improvement of differential selectivity to accelerations from different directions. In FIGS. 3, 4 and 5, parts similar to the embodiment of FIGS. 1 and 2, are similarly numbered, but with a 100 prefix. In FIGS. 3, 4 and 5, a housing 110 defines a chamber 111. An inertial pendulum member 112 is suspended within the chamber by pivotal suspension 115 comprising, for example, a ball 116 and socket 117. A pair of electrical terminals 118 and 119 are connected through housing 110 to the pendulum 112, and to contact plate 122, by conductors 120 and 121 respectively. A pair of leads 123 and 124 connect terminals 118 and 119 to a battery and detonator circuit for the air bag device. Contact plate 122 differs from contact plate 22 of FIGS. 1 and 2, in that where contact plate 22 is generally circular, contact plate 112 is generally elliptical. Whereas the response of the sensor of FIG. 1 is uniform in any direction the response of the unit of FIGS. 3, 4 and 5 is a function of the direction of the acceleration. For example, for accelerations in the plane of the drawing of FIG. 3, directed either towards the left or the right of FIG. 3, pendulum 112 must move through the angular distance $Z$ in order to make contact. However, for accelerations acting either towards the top of the bottom of the drawing in FIG. 3, pendulum 112 must move through the angular distance $Y$ of FIG. 4 in order to make contact. Thus, the device exhibits a higher threshold in one direction than the other. Such a characteristic is very useful, as has previously been explained, since the response in energy absorbing characteristics of automobile structures are different from side collisions than for head-on collisions.

Although the embodiment shown in FIGS. 3, 4 and 5 shows a generally elliptical contact plate, the contact plate need not be symmetrical, but can be made in any irregular shape desired. For example, it might be desired to have one response threshold from either side, a second threshold for rear collisions, and yet a third threshold for front collisions. A contact plate having the desired spacings and orientation can easily be made according to the present invention. In general, as viewed in FIGS. 2 or 3, the spacing of the contact plate from the pendulum can be made to be any desired function of the azimuthal angle rotated about the nominal pendulum position in the plane of FIGS. 2 or 3.

In practice, the actual shape of the contact plate for a given application would be determined by establishing the envelope of nominal thresholds of response, by utilizing computers in evaluating varied operating conditions such as masses and sizes of vehicles, speeds, accelerations, directions of impact, and energy dissipation characteristics of the vehicles and obstacles.

In some applications, it may be desirable to use a first sensor mounted near the front of a vehicle, and a second sensor mounted near the rear. The two sensors would be wired in parallel, so that in case of a simultaneous front and rear collision, at least one of them would switch the air bag.

Figure 6:
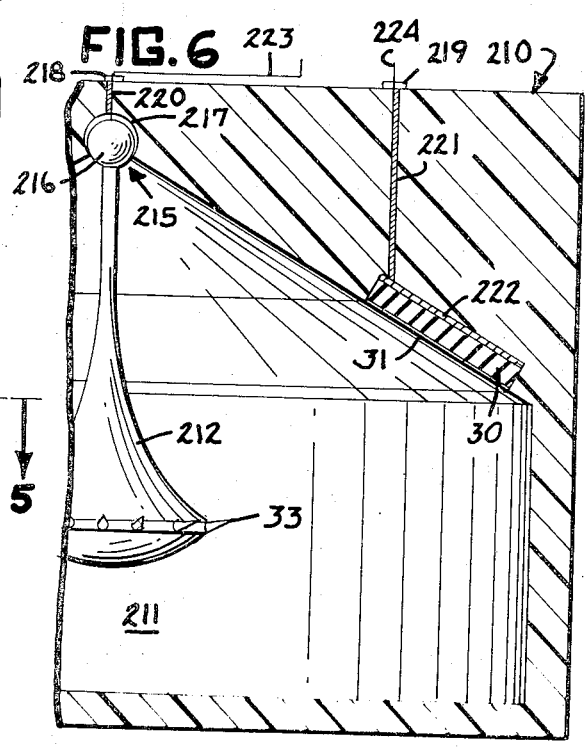
FIG. 6 is a partial diagrammatic view of another embodiment of the present invention.

A further improvement according to the present invention is shown in FIG. 6. In FIG. 6, an inertial pendulum member 212 is suspended by a pivotal suspension 215 comprising ball 216 and socket 217 in a chamber 211 within a housing 210, as before. A pair of electrical terminals 218 and 219 are provided as before for connection to an external air bag detonator circuit by leads 223 and 224. Terminal 218 connects internally through lead 220 to pendulum 212. Terminal 219 connects internally through lead 221 to contact plate 222.

A non-conductive membrane normally covers contact plate 222 in this embodiment. The insulative membrane comprises a deformable foam layer 30 covered by an optical outer layer 31. Inner layer 30 may be urethane foam or any other energy absorbing material, and the optional outer layer 31 may be a metal or plastic foil having a predetermined resistance to penetration.

The edge of pendulum 212 has a plurality of pointed protrusions 33. During "normal" accelerations, the pendulum may swing upwardly pushing protrusions 33 against outer layer 31. However, layer 31 has sufficient resistance to penetration to prevent protrusions 33 from piercing through to complete the circuit with contact plate 222. However, during a collision acceleration, the pendulum is moved with sufficient force so that protrusions 33 overcome the resistance to penetration of layer 31, and the circuit is completed with contact plate 222.

It will be appreciated that the embodiment shown in FIG. 6 provides an added degree of selectivity, enabling the crash sensor to distinguish between normal and collision accelerations. It will further be appreciated the the insulative coating contact of FIG. 6 could be used in conjunction with variable spacing contact of FIGS. 3, 4 and 5 to achieve even better performance. Additionally, the embodiment of FIG. 6 could be used with non-conductive fluid media having a predetermined viscosity to provide damping for further controlling the threshold of the sensor.

I claim:

1. A multi-directional crash sensor for triggering an air bag safety device on a vehicle, comprising:
   a. a housing adapted for attachment to a vehicle, said housing defining an enclosed chamber;
   b. an inertial pendulum member having predetermined length, mass, and mass distribution;
   c. means pivotally suspending said pendulum member within said chamber for swinging in any direction;
   d. first electrical contact means mounted on said pendulum member;
   e. second electrical contact means mounted within said chamber around said pendulum member, and aligned for contact by said first electrical contact means upon swinging of said pendulum member;
   f. non-conductive deformable member mounted within said chamber covering said second electrical contact, said deformable member having a predetermined resistance to penetration, in relation to said predetermined length, mass, and mass distribution of said pendulum member, so that said first electrical contact means is driven into contact with said electrical contact means only when said crash sensor is subjected to an acceleration exceeding a predetermined value.

2. A multi-directional crash sensor according to claim 1 wherein said housing is hermetically sealed, and further including a pair of electrical terminals mounted on said housing and connected to said first and second electrical contact means.

3. A multi-directional crash sensor according to claim 1 wherein said pivotal suspension means comprises a ball and socket joint.

4. A multi-directional crash sensor according to claim 1 wherein said pivotal suspension means includes friction means for further rendering said crash sensor insensitive to accelerations below said predetermined value.

5. A multi-directional crash sensor according to claim 1 wherein said deformable member comprises a layer of foam material and an outer layer of metal foil having a predetermined thickness according to the required resistance to penetration.

6. A multi-directional crash sensor according to claim 5 wherein said first electrical contact means comprises a sharp protrusion adapted for piercing said membrane.

7. A differentially responsive multi-directional crash sensor for a vehicle, comprising:
   a. a housing adapted for attachment to a vehicle, said housing defining an enclosed chamber;
   b. an inertial pendulum member having predetermined length, mass and mass distribution;
   c. means pivotally suspending said pendulum member within said chamber for swinging in any direction from a nominal position;
   d. first electrical contact means mounted on said pendulum remote from said pivotal suspension means;
   e. second electrical contact means mounted within said chamber around said pendulum member in spaced apart relationship therefrom, the spacing of said second electrical contact means from the nominal position of said pendulum member being a function of azimuthal position around the nominal position of said pendulum member, so that the response of said crash sensor is different for accelerations from different directions; and
   f. a non-conductive deformable member mounted within said chamber covering said second electrical contact, said deformable member having a predetemined resistance to penetration, so that said first electrical contact means is driven into contact with said second electrical contact means only when said crash sensor is subjected to an acceleration exceeding a predetermined value.

8. A multi-directional crash sensor according to claim 7 wherein said deformable member comprises a layer of foam material and an outer layer of metal foil having a predetermined thickness according to the required resistance to penetration.

9. A multi-directional crash sensor according to claim 8 wherein said first electrical contact means comprises a sharp protrusion adapted for piercing said membrane.

* * * * *